(No Model.) 2 Sheets—Sheet 1.

J. HOWARD.
STOCK CAR.

No. 247,762. Patented Oct. 4, 1881.

Witnesses
C. C. Leishman
H. A. Anderson

Inventor
James Howard
By Wm Bruce
His Att'y (No Model.) 2 Sheets—Sheet 2.

J. HOWARD.
STOCK CAR.

No. 247,762. Patented Oct. 4, 1881.

Witnesses
C. C. Leishman
H. A. Anderson

Inventor
James Howard
By W. Bruce
His Att'y

UNITED STATES PATENT OFFICE.

JAMES HOWARD, OF HAMILTON, ONTARIO, CANADA.

STOCK-CAR.

SPECIFICATION forming part of Letters Patent No. 247,762, dated October 4, 1881.

Application filed April 1, 1880. (No model.)

*To all whom it may concern:*

Be it known that I, JAMES HOWARD, of the city of Hamilton, in the county of Wentworth, in the Province of Ontario, Canada, mechanical engineer, have invented certain new and useful Improvements in Railway Stock-Cars, by means of which food and rest may be given to the stock while in transit, without the delay caused in unloading; and I do hereby declare that the following is a clear, full, and exact description of the same, reference being had to the accompanying drawings, and to the letters of reference marked thereon, which form part of this specification, and in which—

Figure 1:
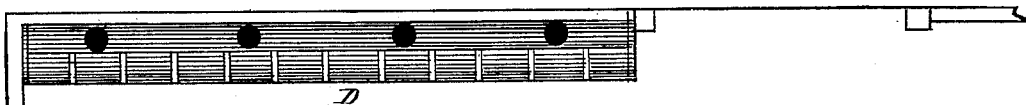
Figure 2:
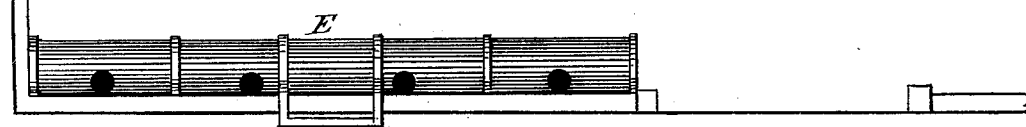
Figure 3:
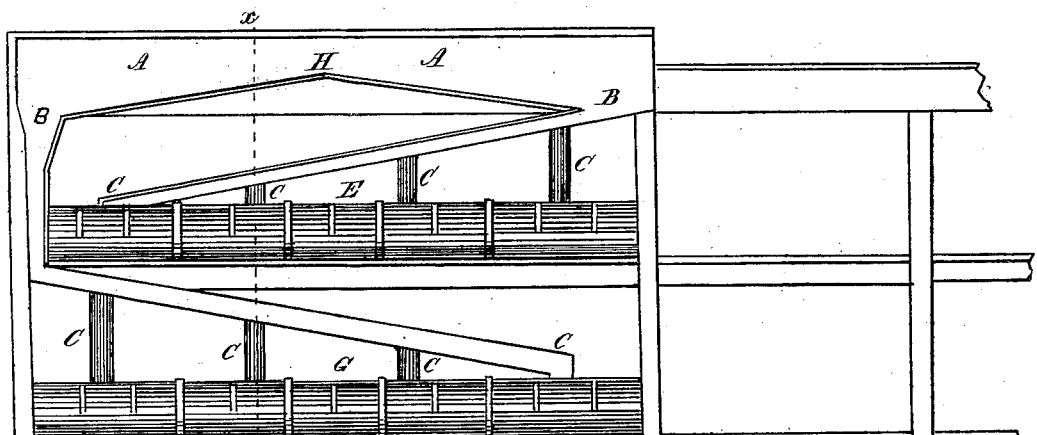
Figure 4:
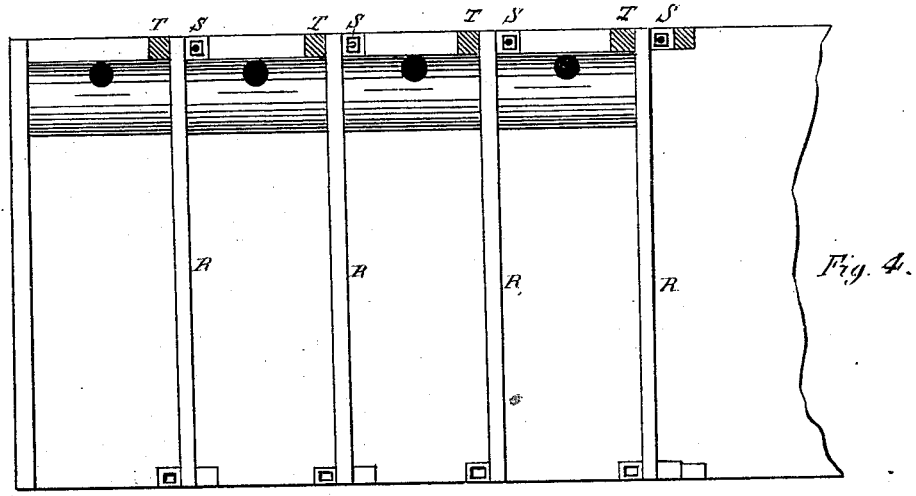
Figure 6:
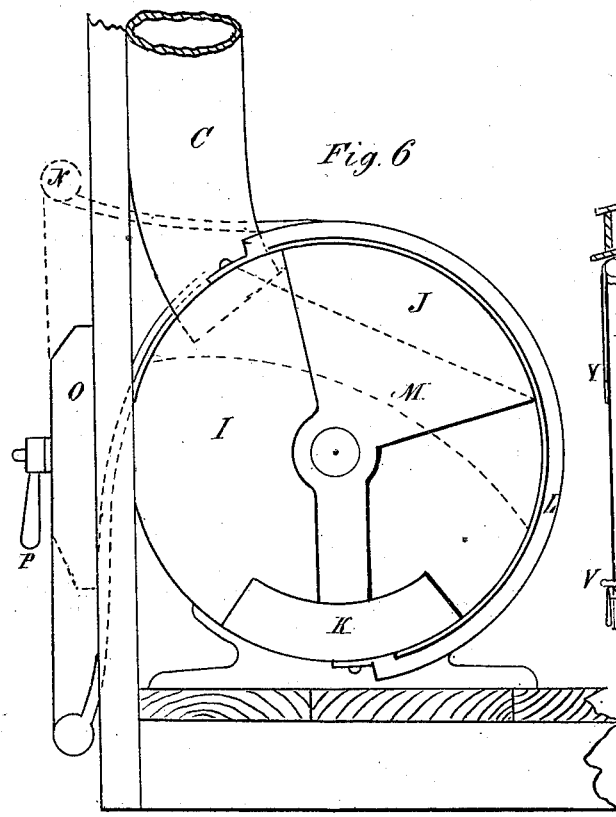
Figure 5:
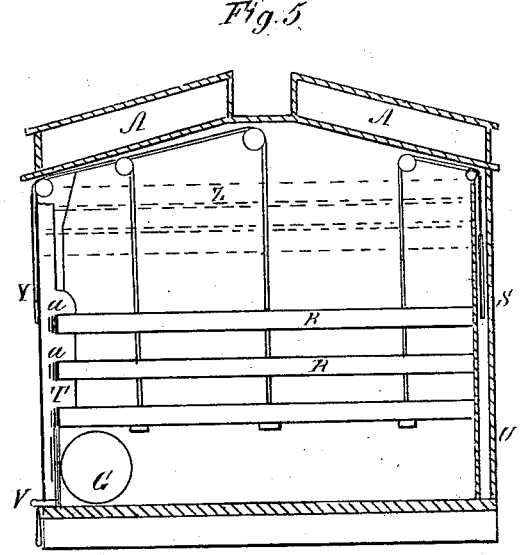

Figure 1, Sheet 1, represents the plan of half a double-decked car, showing the arrangement of troughs for pigs and sheep. Fig. 2, Sheet 1, represents a sectional elevation of the same half of car, showing the arrangement of food-bins and the inclined spouts by which the food gravitates to the troughs below. Fig. 3, Sheet 1, represents a transverse section through $x$ $x$ of Fig. 2. Fig. 4, Sheet 2, represents the plan of half a cattle-car, showing the arrangement of the trough and the divisions for each animal. Fig. 5, Sheet 2, represents a transverse section of the same car, showing the bars in elevation for dividing the animals off singly or in pairs, also the arrangement for raising and lowering the bars. Fig. 6, Sheet 2, represents the end elevation of the trough on a larger scale.

In this invention I have kept in view the adaptation of existing rolling-stock to the purpose described as well as simplicity and inexpensive fittings, and by the use of this invention there will be found no difficulty in making the ordinary double-decked and cattle-cars into feeding-cars at a comparatively small expense.

To more particularly describe my invention I will now refer to the parts in detail.

The principal parts are the food-bins, the troughs, and the dividing-bars.

In the double-decked car, Sheet 1, Fig. 3, A A represent the food-bins, B B the openings by which food passes to the trough below. The bottom of the food-bin is raised in the center, as shown in Fig. 2 at H, in order to make the food gravitate equally in both directions toward the openings B B. C C C C are the spouts conveying the food to the troughs D E.

The trough D, Fig. 1, is shown open. The trough E on same plan is shown closed.

To more particularly describe the troughs, I refer to Fig. 6, Sheet 2. This figure is an enlarged end elevation, showing detail of trough. The trough may be made of common sheet-iron, galvanized sheet-iron, cast-iron, or other suitable material. It is cylindrical in form, as shown in this figure, in which I is the end of the trough. J is a balanced lid covering a quarter-section of the cylinder. K is the balance-weight. L is the guard for the lid M. The dotted lines show the end of one of the interior divisions of the troughs. N is the handle attached to the lid and passing to the exterior of the car, and by means of which the trough is opened. O is a wooden button, held in position by the handled nut P, and which fastens the lid when opened or shut. C is one of the tubes which convey food to the troughs.

The operation of feeding is as follows: Food, such as pease, shelled corn, oats, &c., is placed in the bins A A at starting, the lids of the troughs all being closed. Immediately the car is started, the motion causes the food to gravitate through the openings B B down the tubes C C C C into the troughs D E F G. The divisions M, Fig. 6, extending only a small distance into the troughs, leaves a clear space from end to end in which the food may distribute itself until the trough is filled. To feed the animals it is only necessary to loosen the handled nut P, turn the button O upward, throw up the handle N, and fasten it by the nut P. The lid J has now descended and trough is open. To give the animals water the end of a hose-pipe may be inserted, and the surplus water let off by a plug in the bottom of the trough.

In the cattle-car the operation of feeding is similar to that above described for the stock or double-decked car, the principal difference in the two cars being the provision made for dividing the animals separately or in pairs; but it is obvious that the same system may be applied to both cars.

I have also devised a system of gates for dividing off the cattle, &c. These gates are made to telescope and fall back against the sides of the car when not in use; but as they are not so simple as the bars, I prefer to use them. In Sheet 2, Fig. 5, R R R are the bars hung on flexible wire ropes and balanced by weights on each side, as shown at S. The weight in rising or lowering travels up and down a box-tube, U. The side of this box next the bars forms one side of a groove in which the bars are raised and lowered. The other side of the groove is formed by the rotating standard-fastener T, in which notches are cut, *a a*, for fastening the bars when lowered.

V is a jointed handle for rotating the standard-fastener.

Y is the end of the wire rope by which the bars are raised or lowered.

Z shows the position in dotted lines of the bars when not in use.

The grooves formed by the standard-fastener and weight-box are shown in section in Fig. 4, T S T S T S.

The number of divisions in a car is only limited by the size of the car and the space alloted to each animal.

In loading these cars one animal may be driven in at a time and partitioned off, or the car may be fully loaded and the bars dropped afterward.

The partition and the trough allow the animal to take both food and rest while in transit, and water may be given as described above. It is claimed also that cars with these food-bins on top afford additional security to the brakemen, and by placing the bins upon the slats which usually cover the joints in the roof of these cars provision is made for water passing off beneath them.

Having thus described my invention, what I claim as new is—

1. In a railway stock-car, the combination of the food-bins A A, tubes C C, and cylindrical troughs D E F G, as and for the purpose specified.

2. In combination with railway stock-cars, cylindrical troughs D E F G, with balanced lids J.

3. In combination with railway stock-cars, the balanced bars R R R R and their accompanying fastenings.

Hamilton, Ontario, Canada, February 12, 1880.

JAS. HOWARD.

In presence of—
JAMES B. MOORE,
H. BENNETT.